Oct. 28, 1958      E. SHUFTAN      2,857,806
PHOTOCOMPOSITION SYSTEMS
Filed July 26, 1954
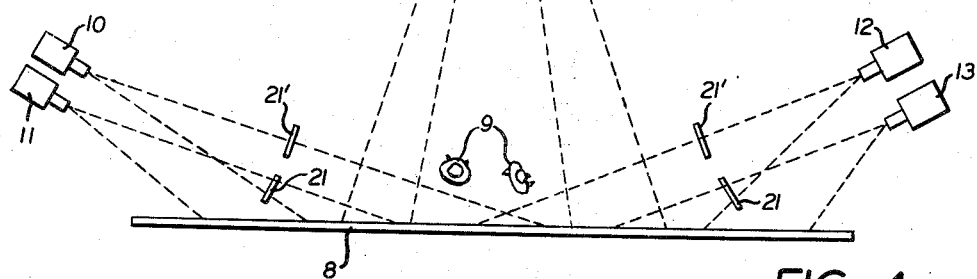
FIG. 1.
FIG. 2.
FIG. 3.
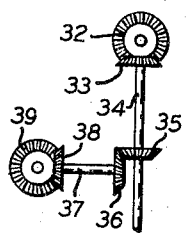
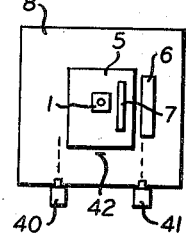
FIG. 5.
FIG. 6.
FIG. 4.
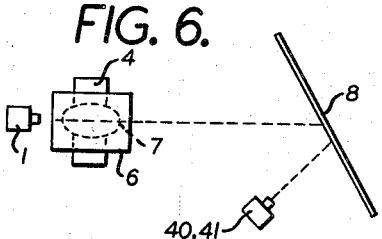
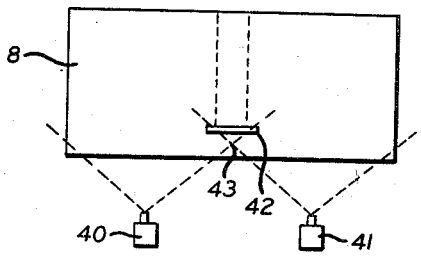
FIG. 7.
FIG. 8.
INVENTOR
EUGEN SHUFTAN
BY
ATTORNEY United States Patent Office 2,857,806
Patented Oct. 28, 1958

2,857,806
PHOTOCOMPOSITION SYSTEMS

Eugen Shuftan, Hollywood, Calif.

Application July 26, 1954, Serial No. 445,750

5 Claims. (Cl. 88—16)

This invention relates to photo composition and more particularly to a method and a system for photo composition reducing accessories such as background, props and actual scenery to a minimum and permitting the taking of well-balanced photographic and television pictures with the least number of operations.

One of the objects of the invention is to combine a live action with a background of rather large extension composed of a number of pictures superimposed or juxtaposed without causing light unbalance or separation effects.

Another object of the invention is to permit the participating personnel, such as actors and camera operators to observe the combined effect of live action and pictures while the picture is taken with least loss in taking time.

Still another object of the invention is a transportable unit which, while being operable like an ordinary camera with respect to a live scene, also permits a combination of a number of pictures of transparencies with such live scenes and observation of the combined effects during shooting with a minimum of delay.

A further object of the invention is to insert into the light path of the camera from the live scene, a twin reflecting system in and out-of-focus position with respect to the camera, adapted to cause with the aid of suitable projectors, reflections in opposite directions including one direction in which background representing pictures of transparencies are projected behind the live scene and another direction in which substantially the same background presenting pictures of transparencies are projected onto the camera.

In a specific embodiment of the invention the reflecting system inserted into the path of the light between camera and live scene, or another reflecting system replacing such system is provided with a cutout portion permitting passage of the live scene without preventing reflection of the background picture surrounding the live scene.

In another specific embodiment of the invention, additional side projectors are arranged directly to project pictures onto the live stage to facilitate lining up the pictures directed over the twin reflecting system to the stage, thereby assuring the line up of the pictures reflected over that same reflecting system onto the camera.

In still another embodiment of the invention, the same projector is arranged to reflect the background pictures or picture over the twin reflecting system onto the camera as well as onto the stage, such reflector being revolved at successive time intervals, with the same reflecting system being arranged in one position and at one instance to reflect the background pictures onto the stage and in another position and at another instance to reflect the background picture onto the camera.

Still further a realization of the invention is to provide such a reflecting system or another reflecting system replacing such system with a cutout or scratched portion permitting unimpeded passage of the live scene onto the camera without, however, impairing the reflection onto the camera of the background picture around that live scene.

These and other objects of the invention will be more fully understood from the drawings annexed herewith, in which:

Figure 1 illustrates a schematic representation of a camera structure and operation embodying certain features of the invention;

Figs. 2 and 3 represent in top and side elevation a portion of its control mechanism;

Fig. 4 shows a resulting picture;

Figs. 5, 6 and 7 show a modification of the projector arrangement of Fig. 1;

Fig. 8 shows another modification of the invention.

In Fig. 1 there is arranged a camera 1 and a pair of projectors 2 and 3, the latter opposing each other with their common optical axes substantially perpendicular to the optical axis of camera 1. Camera 1 may be of any construction such as a moving picture, still camera, or television type without departing from the scope of this disclosure.

Similarly, projectors 2 and 3 may have any appropriate structure to project still, motion picture, or television images, also without departing from the scope of this disclosure.

Optical reflecting system 4 includes a double reflecting mirror or layer 5 which is arranged in the light path of camera 1 arranged at a 45 degree angle at the intersection of the optical axis of camera 1 with the common optical axis of opposing projectors 2 and 3.

Double reflecting layer 5 has reflecting surfaces 5A, B, on opposite sides thereof, reflecting into opposite directions.

In the position of optical system shown in Fig. 1, surface 5A reflects a picture into camera 1, derived from projector 2, and projected from a screen 6 by a lens system schematically indicated at 7.

At the same time reflecting surface 5B will reflect the picture derived from projector 3 onto a blank stage wall or screen schematically indicated at 8 and adapted to receive the background in front of which a live scene schematically indicated at 9 is shown to take place.

Screen 6 can be replaced by a photograph or picture without exceeding the scope of the invention.

In the embodiment shown, camera 1 and projector 3 are placed at equal distances from mirror 5 and have substantially the same objectives so that the beams associated with both apparatus impinge upon one and the same place of the projection surface 8.

In order to facilitate proper lineup and checking of live scene 9 with the pictures of the background transparencies projected on wall 8 from projector 3, these background pictures as derived from projector 3 are rendered more visible by means of a number of direct projectors 10, 11, 12 and 13, arranged at an angle with respect to the optical axis of camera 1 so as not to interfere with the play of the actors, so that background scenery is projected on wall 8 in the proper position with respect to live scene 9, taking place in front of wall 8.

In order to obtain undistorted pictures from side projectors 10 to 13, it is neccessary to project distorted pictures so that the distortion caused by the angular position of side projectors 10 through 13 will be compensated or eliminated.

Optical reflecting system 4 is arranged in an out-of-focus position with respect to both camera 1 and projectors 2, 3.

In optical system 4, reflecting layer 5 is arranged on glass plate 14 near camera 1 so that the background picture derived from projector 2 is then registered on camera 1 in as accurate a manner as possible while the definition of the picture directed by projector 3 onto wall 8 can be of lesser accuracy, serving merely or principally to facilitate lineup of the reflected background picture from projector 3 with the pictures directly projected from side projectors 10 through 13 on wall 8. This direct projection will render more visible the background and will also permit better to visualize the combination of life action and background in their actual relative position as registered in camera 1.

In order to permit the background picture or pictures properly to blend in camera 1 with live action 9, reflecting layer 5 is provided with an irregular cutout portion 5' permitting unimpeded passage into camera 1 of the light derived from live scene 9. At the same time due to the out-of-focus position of optical reflecting system 4, the separation lines defining cutout portion 5' are projected relatively unsharply causing a practically unnoticeable transition from the background scenery derived from the pictures or projector 2 by reflection on mirror 5 with live action 9 derived directly through cutout portion 5' of mirror 5.

A mirror of the type shown at 5, 5' is well known per se as apparent from my United States patent specifications: Re. 16,466; 1,601,886; 1,569,789; 1,606,482; 1,606,483; 1,613,201; 1,627,295; 1,636,112; 1,690,039.

Instead of scratching out or cutting a portion 5' from mirror 5, the entire mirror 5 may be replaced by another almost identical mirror layer 16 adjacent layer 5, except that mirror 16 has such a cutout portion prepared thereon, corresponding to the abovementioned cutout portion 5'.

Such a cutout mirror or layer 16 may consist of one piece with mirror or layer 5 or of separate pieces, the two layers being arranged on a continuous glass backing 17 and supported on a frame 18 through which the desired layer may be inserted into the light path of camera 1 by a simple sliding movement in the direction of arrow 19, or by any other adjustment means without departing from the scope of this disclosure.

In a simplified, yet less practical modification of the arrangement of Fig. 1, which need not be illustrated or described in detail because it is apparent from Fig. 1 itself and from the description of this figure, projector 3 can be omitted altogether and the lineup of the background pictures can be effected by projecting the picture from projector 2 first onto wall or screen 8. Thereafter, in order to deflect the background picture in a direction opposite to the direction pointing into camera 1, optical system 4 or mirror 5 is turned about an angle of 180 degrees about an axis extending perpendicular to the plane of this drawing and extending through point of intersection 20. In this modification, the picture derived from projector 2 will be deflected from camera 1 toward wall or screen 8, thereby permitting lineup or checking with the picture or picture portions produced on wall 8 by side projectors 10 to 13.

The new position of mirror 5 is indicated in Fig. 1 by dotted line 20'.

Thereafter mirror 5 is turned back into the full line position shown in Fig. 1, and the cutout portion scratched out at 5' to permit passage of the live action derived from scene 9; alternatively as stated above, mirror 5 can be replaced by another mirror such as shown at 16 which is substantially identical with mirror 5 except that it has a scratched out portion similar to that indicated at 5' for mirror 5.

In order to facilitate blending of the picture components produced by side projectors 10 through 13, the different pictures and the corresponding projecting beams are caused to overlap, and according to another embodiment of the invention in these overlapping sections, and in an out-of-focus position with respect to projectors 10 through 13, masks 21 are arranged causing blurring of the separation lines between the adjacent picture components.

For this reason Fig. 1 shows the cooperation of film projectors 10 to 13 arranged to project their light beams behind the actor, with film projector 3. Since juxtaposed projection is one of the features of the invention, there are added in Fig. 1 masks 21' to cause transition of the pictures derived from projectors 10 and 12.

Masks such as indicated at 21' represent a development of the Shuftan inventions disclosed in the abovementioned specifications in the form of a mirror. In the present case, the invention takes the form of a mask operating in the optically unsharp zone to cause transition of the picture portions from apparatus 2 and the picture portions on projection surface 8, while at the same time masks 21 arranged in the unsharp zone picture portions of projectors 10 to 13 cause transition of the picture portions of projectors 10 to 13.

In a still further modification of the invention, camera 1 is combined, if necessary, in otherwise well-known manner with an additional illuminator system attached or attachable thereto, schematically indicated in Fig. 1 by dotted line 22 to project and observe combined live action and background as derived from joint effects of projector 2, live scene 9 and side projections 10 through 13.

Thus, a far reaching check and lineup of the various effects contributed by background pictures and live action is achieved with a single equipment and a minimum of manual operations with least loss in shooting time.

Naturally, such check and line up of the entire action on and in front of screen 8 can also be achieved in the usual manner by replacing the film in camera 1 by a viewing device 23.

In a further modification of the invention, the complete layer 5 or one hundred percent reflecting section in mirror 5 can be replaced by a semi-reflecting, semi-transparent layer of exactly the same extension as layer 5. Thus, in camera 1 the operator will be able to observe prior to taking the live scene the entire background, and also to line up and check the pictures projected or contributed by side projectors 10 through 13 with the background pictures derived from projector 3 by observing the super- or juxtaposed pictures in camera 1 by a projection lamp or viewing device coupled therewith in a manner similar to that shown in Fig. 1.

The procedure applied in accordance with the invention is about as follows:

As a first step, there is no reflecting system 5 arranged in the light path of camera 1 and camera 1 is focussed sharply on wall or screen 8.

As a second step twin reflecting system 4 is inserted with a fully reflecting mirror 5 projecting the full background picture or pictures from projector 2 onto wall or screen 8.

In a third step, cutout mirror 16 is inserted in place of mirror 5 cutting out that portion of the background in front of which live action 9 is to take place.

As a fourth step, mirror 5 is reinserted into the light path of camera 1 to observe the background derived from projector 2.

At the same time, the background picture derived from projector 3 is projected fully onto wall 8.

In a fifth step, side projectors 10 through 13 are put into operation and lined up with the picture derived from projector 3 so as to cause complete alignment on wall 8 of all picture components contributed by projectors 10 through 13 with the complete picture derived from projector 3.

In a sixth step, cutout mirror 16 is put back to permit passage of live scene to camera 1 and shooting of the combined scene.

Camera and projectors 1, 2 and 3 are arranged as a single movable unit on a platform schematically indicated in Fig. 1 by line 23'.

In a specific example of the invention, if required, platform 23 can be made movable by wheels 24, and if desired, one of these wheels can be coupled to at least one of projectors 1, 2, preferably projector 2, in such a way that if platform 23 is moved in a direction perpendicular to screen 8, in order to adjust the background picture to that of the live scene, projector 2 is caused to move in a direction parallel to screen 8 towards or away from each other.

In order to achieve this purpose, platform 23', as shown in Fig. 1, and in greater detail in Fig. 3, has attached thereto a worm gear transmission 25 meshing with wheel 24 and rotating a shaft 26 driving over another worm transmission gear 27 shaft 28 meshing with nut 29 rigidly attached to projector 2 thereby causing projector 2 to move to and from reflecting system 4 depending upon the sense of rotation of shaft 26.

All elements of coupling 24 to 29 are so dimensioned that any change in picture size on camera 1 caused by camera 1 approaching or withdrawing from wall 8, will cause an approach or withdrawal and an appropriate increase or reduction in size of the background picture or pictures derived from projector 2. Coupling 30 may serve to decouple this coupling mechanism if necessary.

In another example of the invention, if required, the movement of platform 23' or camera 1 about its vertical axis or the axis of its tripod schematically indicated in Figs. 2 and 3 at 31 can be used to cause a corresponding movement or projector 2 to compensate the change in position of the background caused by the rotation of camera 1.

In order to achieve this purpose—if camera 1 is to be rotated—camera 1 is supported on gear wheel 32, see Figs. 1 and 2, causing wheel 33 meshing with wheel 32 to turn shaft 34 which is rotatably but slidingly coupled with wheel 35, which in turn causes wheels 36 and shaft 37 to rotate.

Shaft 37 in turn drives wheel 38 meshing with wheel 39 supporting and rotating projector 2.

Thus, under control of rotation of camera 1 projector 2 will be rotated in appropriate directions to change the position of the background pictures reflected from system 4 in accordance with the change in position of camera 1 with respect to the background directly projected on screen 8.

After a change in position of camera 1 and projector 2, if necessary, projector 3 can be realigned manually, or if required, projector 3 may be driven automatically by coupling mechanisms similar to those shown for projector 2, at 25 to 29, and 32 to 39 respectively, without departing from the scope of this disclosure.

It may also be desirable to adjust the focus of projector 2—or of any other projector or camera used in accordance with this invention—by coupling the focusing device (not shown) of projector 2 in otherwise well-known manner with one or the other of, or both, couplings 25 to 29, and 32 to 39 to assure continuous sharpness of the background on camera 1.

Figs. 5 and 6 in front and side views respectively show one form of the angular position of juxtaposed projectors in accordance with the invention in which projectors 40, 41 are arranged below the projection surface 8.

In this case projection surface 8 is inclined towards the front of and against projectors 40, 41 and projection surface 6 and lens system 7 are inclined in the opposite direction so that the distortion of projection due to angular position will be compensated and camera 1 will receive a somewhat balanced picture.

In order to reduce undesired transition effects occurring in zones between adjacent picture portions a shutter or mask 42 is arranged in out-of-focus position with respect to projectors 40, 41 near point 43 where the corresponding light beams intersect preferably, however, between point 42 and screen 8 but closer to point 43, as shown in Fig. 7.

In this position of mask 42 the separation lines between the two pictures will be blurred and a substantially continuous transition from one picture portion to another picture portion will be produced.

In Fig. 8 the invention is applied in otherwise well-known manner to large screen projection wherein for example a wide angle projection screen 44 is covered by several projectors 45, 46 and 47 producing three adjacent or juxtaposed picture components.

In accordance with the invention the corresponding picture portions are caused to overlap and the overlapping effects are reduced or eliminated by arranging in the path of the corresponding light beams as schematically indicated in Fig. 8, shutters or masks 48, 49 in an out-of-focus position with respect to the projection systems of projectors 45, 46, 47.

As schematically indicated in Fig. 8, by two pairs of arrows 50, 51 and 52, 53 shutters 48, 49 are adjustable in any desired direction—horizontally in two perpendicular directions and/or vertically up and down to adjust transition effects to a minimum. The latter occurs perpendicular to the plane or illustration and therefore is not shown but can be easily visualized without additional illustration or explanation.

In order to facilitate adjustment, if required, the various shutter adjustments may be intercoupled mechanically or electrically as indicated for example by dotted lines 54, 55 and operated from a distance, all this without exceeding the scope of the invention.

The invention is not limited to the form, arrangement and type of adjustment means shown and described nor is it limited to the particular form of the out-of-focus or reflecting elements or to position and shape of cutout and uncut portions, nor to form, type or arrangement of projectors shown and described. The invention can be utilized in any form whatsoever without departing from the scope of this disclosure.

I claim:

1. In a photocomposition system, a stage for receiving live action and a screen arranged behind said stage for receiving background pictures, a camera for simultaneously recording live action and pictures, first and second projecting means, reflecting means angularly arranged across the light path of said camera, including a mirror having two reflecting surfaces on opposite sides thereof and in each of said reflecting surfaces cut out portions having irregular outlines separating said cut out portions from said reflecting surfaces; said cutout portions being transparent and arranged to permit passage of the live action directly from said stage to said camera; the reflecting surfaces being arranged to reflect from said one side thereof the picture from said first projecting means into said camera; and to reflect from said other side thereof the picture from said second projecting means on to said screen so as to permit juxta-position both in said camera and on said stage of said live action and said pictures in substantially the same relative positions, and means for directly projecting at least one picture on to the front of said screen, aligned with the picture, projected upon said screen through said reflecting means from said second projecting means to render the background more visible.

2. System according to claim 1 comprising another mirror having two reflecting surfaces on opposite sides thereof substantially without including any cutout portions; the two mirrors being arranged to replace each other in substantially the same angular position so as to permit recording of a complete picture, said camera and substantially simultaneously observation of said complete picture on said screen in substantially the same position with respect to the optical axis of said camera.

3. System according to claim 1, wherein said camera and said first and second projecting means are arranged on a platform, movable as a whole and wherein said platform is movable in a direction perpendicular to the said screen and at least the side projecting means projecting a picture over said reflecting means into said camera is movable in a direction parallel to said screen, said two movements being coupled so as to cause said projecting means to approach or withdraw from said reflecting means dependent on the distance between camera and screen, thereby to adjust the size of the picture projected from the stage to the size of the pictures derived from said projecting means.

4. System according to claim 1 wherein said camera is rotatable about a vertical axis, and wherein at least said first projecting means is also rotatable about its vertical axis, the rotation of camera and projecting means being intercoupled to adjust the position of the picture derived from the screen to the position of the picture derived from said projecting means.

5. System according to claim 3 wherein said platform is movable in a direction perpendicular to said screen and at least the projecting means projecting a picture over said reflecting means into said camera is movable in the direction parallel to said screen, said movements being coupled so as to cause said projecting means to approach or withdraw from said reflecting means dependent on the distance between camera and screen, thereby to adapt the size of the picture projected from the screen to the size of the pictures derived from said projecting means; and said the rotation of camera and projecting means being interprojecting means is also rotatable about a vertical axis, coupled to adjust the position of the picture derived from the screen to the position of the pictures derived from said projecting means.

References Cited in the file of this patent

UNITED STATES PATENTS

| 1,601,886 | Schufftan | Oct. 5, 1926 |
| 1,651,574 | Beechlyn | Dec. 6, 1927 |
| 1,808,352 | Hollen | June 2, 1931 |
| 1,869,275 | Planer | July 26, 1932 |
| 1,945,926 | Tolhurst | Feb. 6, 1934 |
| 2,004,986 | Jackman | June 18, 1935 |
| 2,076,103 | Thorner | Apr. 6, 1937 |
| 2,169,045 | Haskin | Aug. 8, 1939 |
| 2,174,931 | Terry et al. | Oct. 3, 1939 |
| 2,553,903 | Dufour | May 22, 1951 |
| 2,727,429 | Jenkins | Dec. 20, 1955 |

FOREIGN PATENTS

| 230,454 | Great Britain | May 13, 1926 |
| 251,912 | Great Britain | May 13, 1926 |
| 768,029 | France | May 7, 1934 |